US006507762B1

(12) United States Patent
Amro et al.

(10) Patent No.: US 6,507,762 B1
(45) Date of Patent: Jan. 14, 2003

(54) METHOD AND SYSTEM FOR REMOTELY CONTROLLING AN APPLIANCE USING A PERSONAL DIGITAL ASSISTANT

(75) Inventors: Hatim Yousef Amro, Austin, TX (US); John Paul Dodson, Pflugerville, TX (US); George Kraft, IV, Austin, TX (US); Kurt Russell Taylor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,629

(22) Filed: Mar. 31, 1999

(51) Int. Cl.[7] .......... G05B 15/02
(52) U.S. Cl. .......... 700/83; 700/9
(58) Field of Search .......... 700/9, 83

(56) References Cited

U.S. PATENT DOCUMENTS

| | | | | | |
|---|---|---|---|---|---|
| 4,868,893 | A | * | 9/1989 | Hammond | 359/143 |
| 5,778,256 | A | * | 7/1998 | Darbee | 395/892 |
| 5,831,664 | A | * | 11/1998 | Wharton et al. | 348/13 |
| 5,835,732 | A | * | 11/1998 | Kikinis et al. | 345/173 |
| 5,909,183 | A | * | 6/1999 | Borgstahl et al. | 340/10.51 |
| 5,949,351 | A | | 9/1999 | Hahm et al. | |
| 6,119,179 | A | * | 9/2000 | Whitridge et al. | 235/380 |
| 6,195,589 | B1 | * | 2/2001 | Ketcham | 700/28 |
| 6,216,158 | B1 | * | 4/2001 | Luo et al. | 709/217 |
| 6,292,181 | B1 | * | 9/2001 | Banerjee et al. | 345/179 |
| 6,292,186 | B1 | * | 9/2001 | Lehman et al. | 345/335 |
| 6,292,283 | B1 | * | 9/2001 | Grandbois | 359/143 |
| 6,330,482 | B1 | * | 12/2001 | McCain et al. | 700/17 |
| 6,353,413 | B1 | * | 3/2002 | White et al. | 342/453 |
| 6,377,860 | B1 | * | 4/2002 | Gray et al. | 700/83 |

FOREIGN PATENT DOCUMENTS

| | | |
|---|---|---|
| EP | 0 626 635 A | 11/1994 |
| EP | 0 780 990 A | 6/1997 |

* cited by examiner

*Primary Examiner*—Leo Picard
*Assistant Examiner*—Elliot Frank
(74) *Attorney, Agent, or Firm*—Sawyer Law Group, LLP

(57) ABSTRACT

A method and system for remotely controlling an appliance including a first wireless communication port is disclosed. In one aspect, the method and system provide a portable digital device for remotely controlling an appliance. The portable digital device includes a processor, a second wireless communication port coupled with the processor, and a control program for use by the processor. Upon a query provided from the second wireless communication port to the first wireless communication port, an interface residing on the appliance is provided from the appliance to the portable digital device. This allows the control program to control the appliance using the interface. In another aspect, the method and system include providing the interface residing on the appliance. The interface is capable of being uploaded to a portable digital device including a processor, a control program, and a second wireless communication port. In another aspect, the method and system include providing a command from the second wireless communication port of the portable digital device to the first wireless communication port of the appliance, executing the command using the appliance, and providing a response from the first wireless communication port of the appliance to the second wireless communication port of the portable digital device.

12 Claims, 6 Drawing Sheets

METHOD AND SYSTEM FOR REMOTELY CONTROLLING AN APPLIANCE USING A PERSONAL DIGITAL ASSISTANT

FIELD OF THE INVENTION

The present invention relates to controlling appliances and more particularly to a method and system for remotely controlling appliances using a portable digital device.

BACKGROUND OF THE INVENTION

Current technology allows conventional appliances capable of limited data processing to be used for a wide variety of purposes. For example, conventional water, gas, or electric meters are capable of tracking the water, gas, and electric usage of a household. Although these conventional appliances are useful, a user must be in proximity to many of these conventional appliances in order to control or obtain data from the conventional appliances. For example, the conventional water, gas, and electric meters typically include some kind of a display. The household's usage is typically illustrated on the display. The meters are read in order to determine the cost providing water or gas to the household. Currently, the displays are relatively small, forcing a user to be in proximity to the meter in order to read the display the meter. Similarly, a user must be within reach of the meter to zero the meter's display or perform other operations on the meter.

Some conventional appliances, such as audio or video equipment can be controlled using a conventional remote control. The conventional remote control can provide commands to the conventional appliance. If the conventional appliance receives the command, the conventional appliance will perform the command. However, the user still relies on the conventional appliance's display to obtain data about the status of the conventional appliance or determine whether the command provided via the remote control was performed.

Accordingly, what is needed is a system and method for remotely controlling an appliance. It would be desirable if the system and method could both control and obtain data from the appliance. The present invention addresses such a need.

SUMMARY OF THE INVENTION

The present invention provides a method and system for remotely controlling an appliance including a first wireless communication port. In one aspect, the method and system provide a portable digital device for remotely controlling an appliance. The portable digital device includes a processor, a second wireless communication port coupled with the processor, and a control program for use by the processor. Upon a query provided from the second wireless communication port to the first wireless communication port, an interface residing on the appliance is provided from the appliance to the portable digital device. This allows the control program to control the appliance using the interface. In another aspect, the method and system include providing the interface residing on the appliance. The interface is capable of being uploaded to a portable digital device including a processor, a control program, and a second wireless communication port. In another aspect, the method and system include providing a command from the second wireless communication port of the portable digital device to the first wireless communication port of the appliance, executing the command using the appliance, and providing a response from the first wireless communication port of the appliance to the second wireless communication port of the portable digital device.

According to the system and method disclosed herein, the present invention allows appliances to be remotely controlled and read. This facilitates a user's ability obtain data from and configure a wide variety of appliances which may be difficult for the user to physically access.

DETAILED DESCRIPTION OF THE INVENTION

The present invention relates to an improvement in a user's ability to remotely access a wide variety of appliances. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
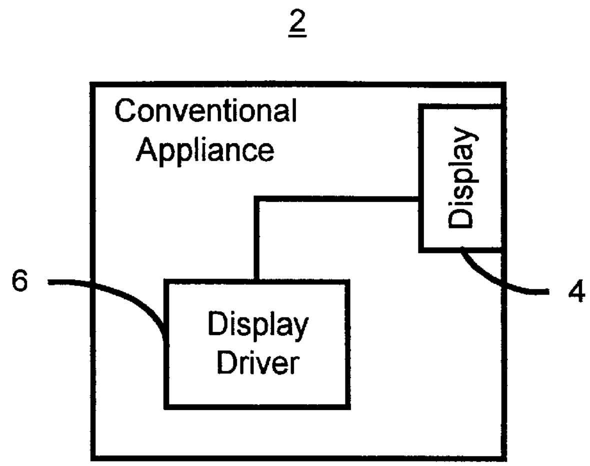
Prior Art Figure 1
FIG. 1 is a block diagram of a conventional appliance.

FIG. 1 is a block diagram of a conventional appliance 2, such as a water, gas, or electric meter. The conventional appliance 2 includes a display 4 and a data processor 6. The data processor 6 merely performs some operations relating to the status and functions of the conventional appliance 2. The display 4 may display the status of the conventional appliance 2 or information relating to the functions of the conventional appliance 2. For example, if the conventional appliance 2 is an electric meter, the display 4 may indicate the number of kilowatt hours that a corresponding household has used since a previous reading.

Although the conventional appliance 2 may provide sufficient information via the display 4, one of ordinary skill in the art it will readily realize that it is difficult for the display 4 to be read from a distance. Thus, a user wishing to read the display 4 or operate the appliance 2 using information on the display 4 must be close to the conventional appliance 2. Where the conventional appliance 2 is a device such as an electricity or gas meter, the user may be forced to cross onto the property of the owner of the house to which the conventional appliance 2 is attached. As a result, the user may exposed to hazards on the property, such as dogs.

Figure 2:
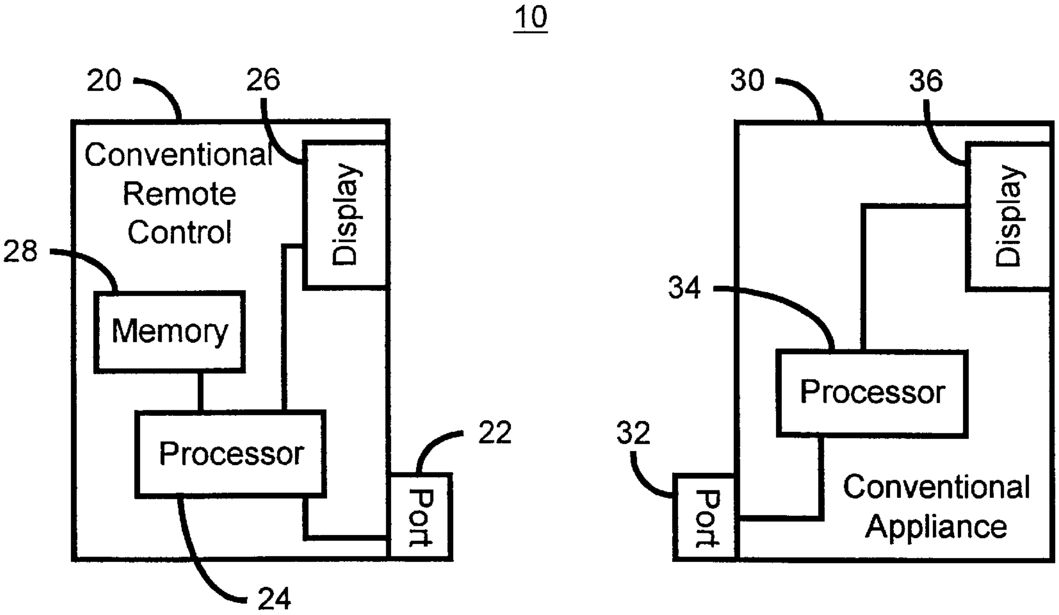
Prior Art Figure 2
FIG. 2 is a block diagram of a conventional remote control and a conventional appliance which the conventional portable digital device controls.

Thus, it would be desirable to control the conventional appliance from a distance. FIG. 2 depicts a system 10 for remotely controlling an appliance 30. The system 10 includes a conventional remote control 20 and a conventional appliance 30. The conventional appliance 30 is analogous to the conventional appliance 2. The conventional remote control 20 includes a wireless communication port 22, a processor 24, an optional display 26, and may include a memory 28. The display 26, the memory 28, and the wireless communication port 22 are coupled to the processor 24. The conventional remote control 20 could include a personal digital assistant or other computer system having limited memory and functionality. In such an embodiment, the conventional remote control 20 would include the display 26 and the memory 28. The conventional remote control 20 could also include a universal remote control used to control more than one device. The conventional appliance 30 includes a wireless communication port 32, a processor 34, and a display 36. The wireless communication ports 22 and 32 typically include infrared ports (e.g. IrDA ports) or radio ports. The processors 34 is typically capable of providing limited data processing.

Figure 3A:
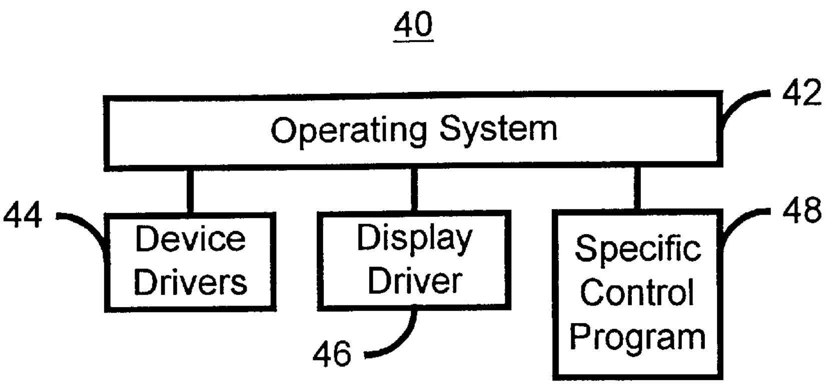
Prior Art Figure 3A
FIG. 3A is a block diagram of the architecture of the conventional remote control.
Figure 3B:
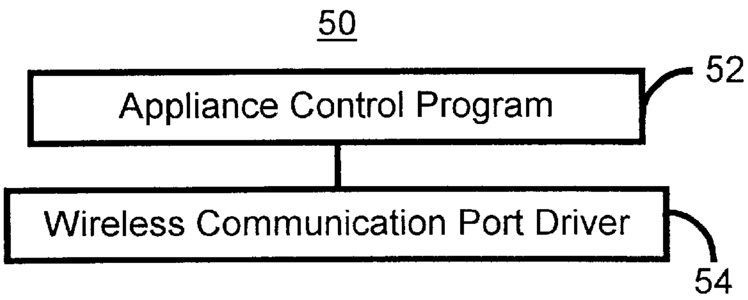
Prior Art Figure 3B
FIG. 3B is a block diagram of the architecture of the conventional appliance.

FIGS. 3A and 3B depict the architectures of the conventional remote control 20 and the conventional appliance 30, respectively. Referring to FIG. 3A, the architecture 40 of conventional remote control 20 may include an operating system 42, device drivers 44, a display driver 46, and a specific control program 48. The device drivers 44 are used to allow the processor 24 to control devices in the conventional remote control 20, such as the wireless communication port 22. The specific control program 48 allows the conventional remote control to control the conventional appliance 30. Thus, the specific control program 48 is built especially for the conventional appliance 30, or other similar appliances (not shown).

Referring now to FIG. 3B, the architecture 50 of the conventional appliance 30 includes an appliance control program 52 and a wireless communication port driver 54. The appliance control program 52 allows the conventional appliance 30 to perform operations based on commands provided to the conventional appliance 30. The wireless communication port driver 54 allows the conventional appliance 30 to control the wireless communication port 32. Thus, the conventional appliance 30 can receive commands via the wireless communication port 32.

Figure 4:
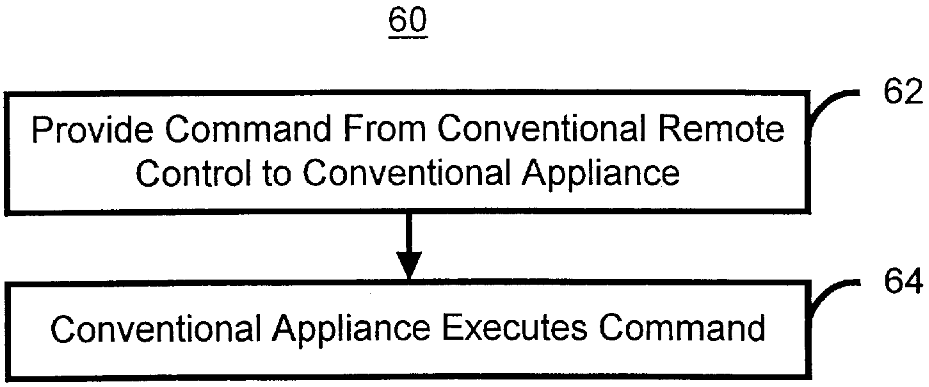
Prior Art Figure 4
FIG. 4 is a flow chart of a conventional method for remotely controlling an appliance.

FIG. 4 depicts a flow chart of a method 60 for utilizing the conventional remote control 20, the architecture 40, the conventional appliance 30, and the architecture 50. A command is provided from the wireless communication port 22 of the conventional remote control 20 to the wireless communication port 32 of the conventional appliance 30, via step 62. For example, the conventional appliance 30 may be a television and the command may be to increase or decrease the volume. To provide the command, the wireless communication port 22 must be aligned with the wireless communication port 32 when the command is transmitted. If the wireless communication port 32 received the command, then the conventional appliance 30 performs the command, via step 64.

Although the method 60 allows the conventional appliance 30 to perform commands provided by the conventional remote control 20, one of ordinary skill in the art will readily realize that the method 6 still requires a user to be in proximity to the conventional appliance 30. The display 36 is the only place that the status of the conventional appliance 30 is reflected. No information is transmitted from the conventional appliance 30 to the conventional remote control. The user still relies on the display 36 of the conventional appliance 30 to determine whether the command has been performed by the conventional appliance 30. Only by reading the display, therefore, can the user determine whether the command was transmitted to and performed by the conventional appliance 30. Some conventional appliances may have relatively large displays 36. However, many conventional appliances have relatively small displays 36. Thus, in order to read such a display, the user may need to be close to the conventional appliance 30. Thus, the user is exposed to the same hazards as when the user directly controls the conventional appliance 30.

The conventional remote control 20 is also limited in the conventional appliances 30 that can be controlled. The specific control program 48 is specifically provided for a single conventional appliance 30 or a limited number of appliances. The conventional remote control 20 cannot, therefore, control appliances (not shown) for which the specific control program 48 was not designed.

Note that conventional smart cards function in a similar fashion. Like the conventional appliance 30, a conventional smart card contains a processor 34 and a port 32. The smart card also would contain a control program 52 and a driver 54 for the port. Similarly, like the conventional remote 20, a conventional host system includes memory 28, a processor 24, and a port 22. The conventional host system would also include an operating system 42, device drivers 44, a display driver 46, and a specific control program 48 for a particular conventional smart card. Thus, the conventional host system must have information about the specific conventional smart card to be controlled. The conventional host cannot control smart cards for which this specific information is not provided.

The present invention provides a method and system for remotely controlling an appliance including a first wireless communication port. In one aspect, the method and system provide a portable digital device for remotely controlling an appliance. The portable digital device includes a processor, a second wireless communication port coupled with the processor, and a control program for use by the processor. Upon a query provided from the second wireless communication port to the first wireless communication port, an interface residing on the appliance is provided from the appliance to the portable digital device. This allows the control program to control the appliance using the interface. In another aspect, the method and system include providing the interface residing on the appliance. The interface is capable of being uploaded to a portable digital device including a processor, a control program, and a second wireless communication port. In another aspect, the method and system include providing a command from the second wireless communication port of the portable digital device to the first wireless communication port of the appliance, executing the command using the appliance, and providing a response from the first wireless communication port of the appliance to the second wireless communication port of the portable digital device.

The present invention will be described in terms of particular devices, and interfaces. However, one of ordinary skill in the art will readily recognize that this method and system will operate effectively for other interfaces and other devices. For example, a similar process could be used for controlling smart cards. Smart cards have a processor, memory, a port, and functions. The smart card could upload its interface to a host system, such as a portable digital device or another host computer. This would allow a host system to control the smart card without having the specific information relating to the smart card pre-loaded onto the host.

Figure 5:
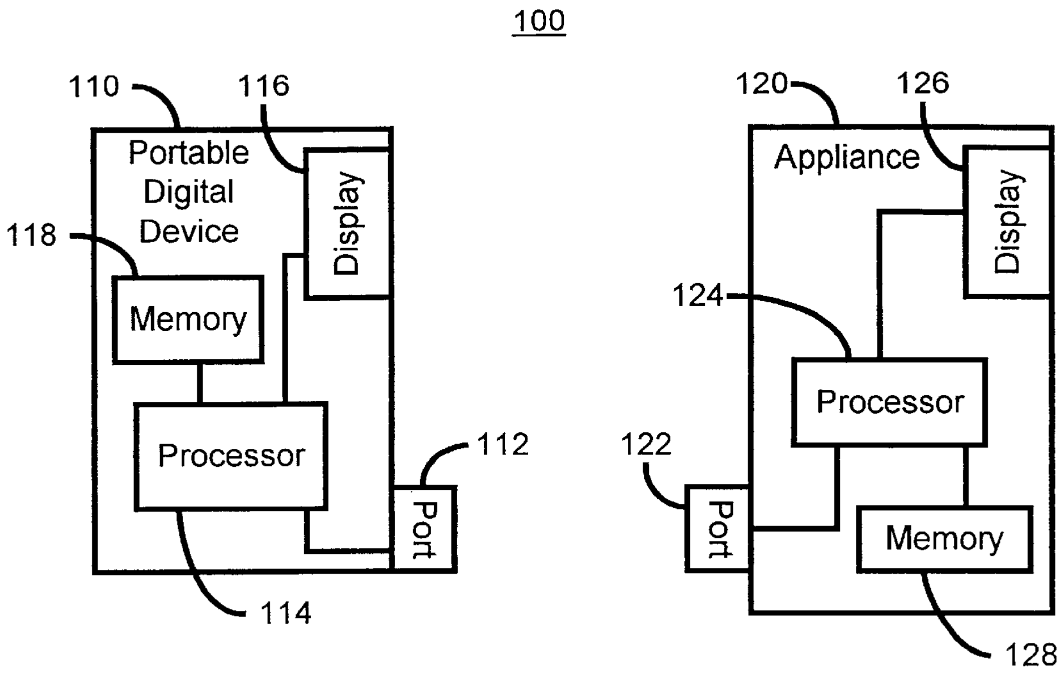
FIG. 5 is a block diagram of one embodiment of a portable digital device and one embodiment of an appliance in accordance with the present invention.

To more particularly illustrate the method and system in accordance with the present invention, refer now to FIG. 5, depicting one embodiment of a system 100 in which a portable digital device 110 can be used to control an appliance 120. The portable digital device 110 includes a wireless communication port 112, a CPU 114, a display 116, and a memory 118. The portable digital device 110 preferably has limited functionality as compared to a desktop computer (not shown). The portable digital device 110 is preferably a Personal Digital Assistant in which the wireless communication port 112 is an IrDA port or a radio port. Also in a preferred embodiment, the display 116 is a touch screen which allows the user to control the portable digital device 110 through a graphical user interface. The appliance 120 includes a wireless communication port 122, a processor 124, a display 126, and a memory 128. The display 126 may be a liquid crystal display ("LCD"). The wireless communication port 122 is preferably an IrDa port 122 or a radio port. The appliance 120 is a device which a user desires to remotely obtain data from or control. Thus, the appliance 120 may include, but is not limited to, a water, gas, or electric meter.

Figure 6A:
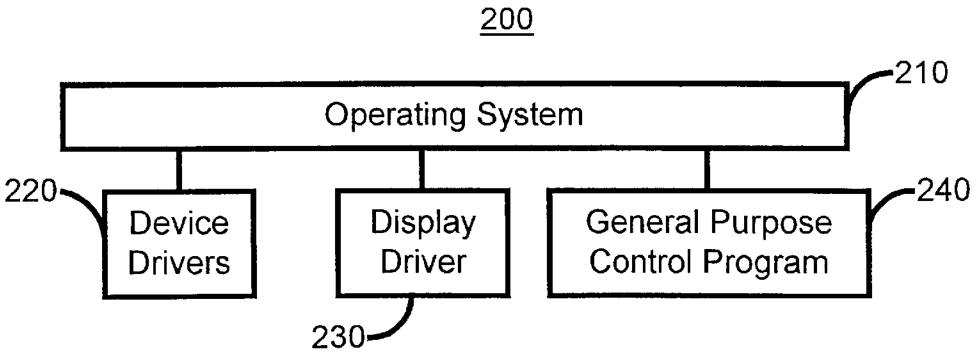
FIG. 6A is a block diagram of the architecture of the portable digital device in accordance with the present invention.
Figure 6B:
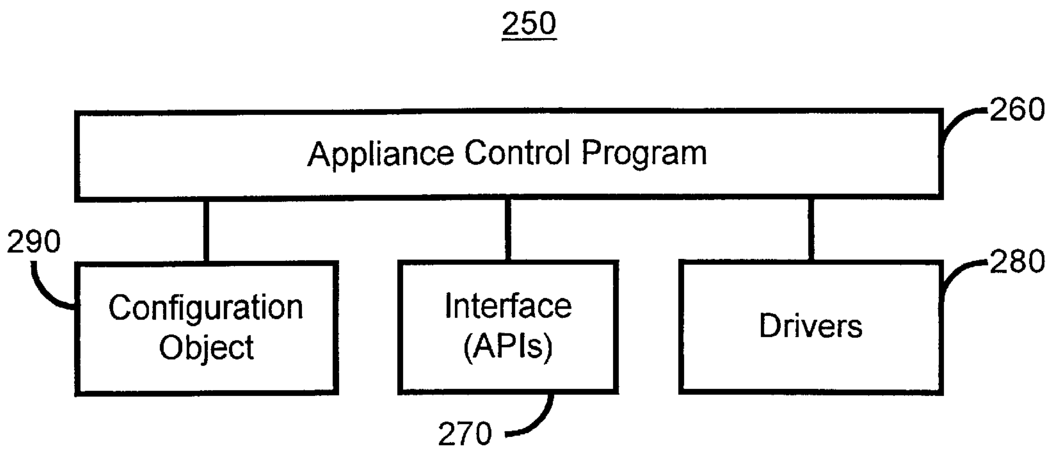
FIG. 6B is a block diagram of the architecture of the appliance in accordance with the present invention.

FIGS. 6A and 6B depict the architectures of the portable digital device 110 and the appliance 120 in accordance with the present invention. Referring to FIG. 6A, the architecture 200 of the portable digital device 110 includes an operating system 210, device drivers 220, a screen driver 230, and a general purpose control program 240 which reside in the memory 118 and are used by the processor 114. The device drivers 220 include a driver for the wireless communication port 112. The screen driver 230 preferably controls the touch screen used as the display 116. The general purpose control program 240 is capable of controlling the appliance 120 through the mechanism discussed below. However, the general purpose control program 240 need not be specifically tailored to a particular appliance 130 or a particular type of appliance 130. Instead, using the method and system in accordance with the present invention, the general purpose control program 240 allows the portable digital device 110 to remotely access the data for and control a wide variety of appliances 120.

Referring now to FIG. 6B, the architecture 250 for the appliance 120 is shown. The architecture 250 includes an appliance control program 260. The appliance control program 260 allows the appliance to perform its functions, such as calculating data for the appliance 120. The architecture 250 also includes an interface 270, device drivers 280, and a configuration object or file 290 coupled to the appliance control program 260. The appliance controls program 260, the configuration object 290, the interface 270, and the drivers 280 reside in the memory 128 and are used by the processor 124. The device drivers 280 include a driver for the wireless communication port 122 and a driver for the display 126. The interface 270 includes a plurality of application program interfaces ("APIs"). In a preferred embodiment, the APIs included in the interface 270 are standard published APIs that are relatively platform independent. In a preferred embodiment, the interface 270 is a JAVA BEANS interface. The configuration object 290 is for providing a graphical interface on the display 126. Thus, the configuration object 290 describes the functions and appearance of the graphical interface. For example, the configuration object 290 may allow the appliance 120 to display a control panel on the LCD display 126.

Figure 7:
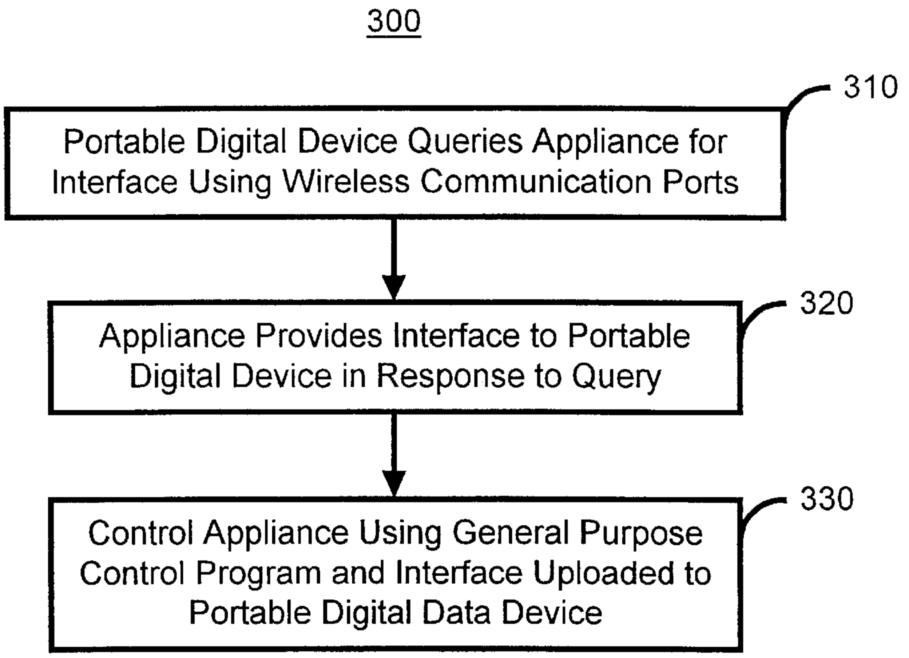
FIG. 7 depicts one embodiment of a method in accordance with the present invention illustrating the interaction between the portable digital device and the appliance in accordance with the present invention.

FIG. 7 is a flow chart depicting one embodiment of a method 300 for allowing the portable digital device 110 to control the appliance 120. The method 300 is preferably used at the commencement of the interaction between the portable digital device 110 and the appliance 120. The portable digital device 110 provides a query to the appliance 120 using communication from the wireless communication port 112 to the wireless communication port 122, via step 310. The query requests the interface 270 from the appliance 120. The appliance 120 uploads the interface 270 to the portable digital device 120 using communication from the wireless communication port 122 to the wireless communication port 112, via step 320. In a preferred embodiment, step 320 includes copying the interface 270 from the memory 128 and providing the copy of the interface 270 to the wireless communication port 122. Preferably, step 320 also includes the portable digital device 110 receiving the copy of the interface 270 and temporarily storing the copy of the interface 270 in the memory 118 for use. Because the interface 270 includes APIs which are known, the general purpose control program 240 can utilize the interface 270 once the interface 270 has been uploaded and stored in the memory 118. Once uploaded, the interface 270 provides the portable digital device 110 with information relating to the configuration and the functions of the appliance 120. The general purpose control program 240 can thus control the appliance 120 using the interface 270, via step 330. Via the portable digital device 110, a user can thus remotely obtain data from and perform operations on the appliance 120.

Figure 8:
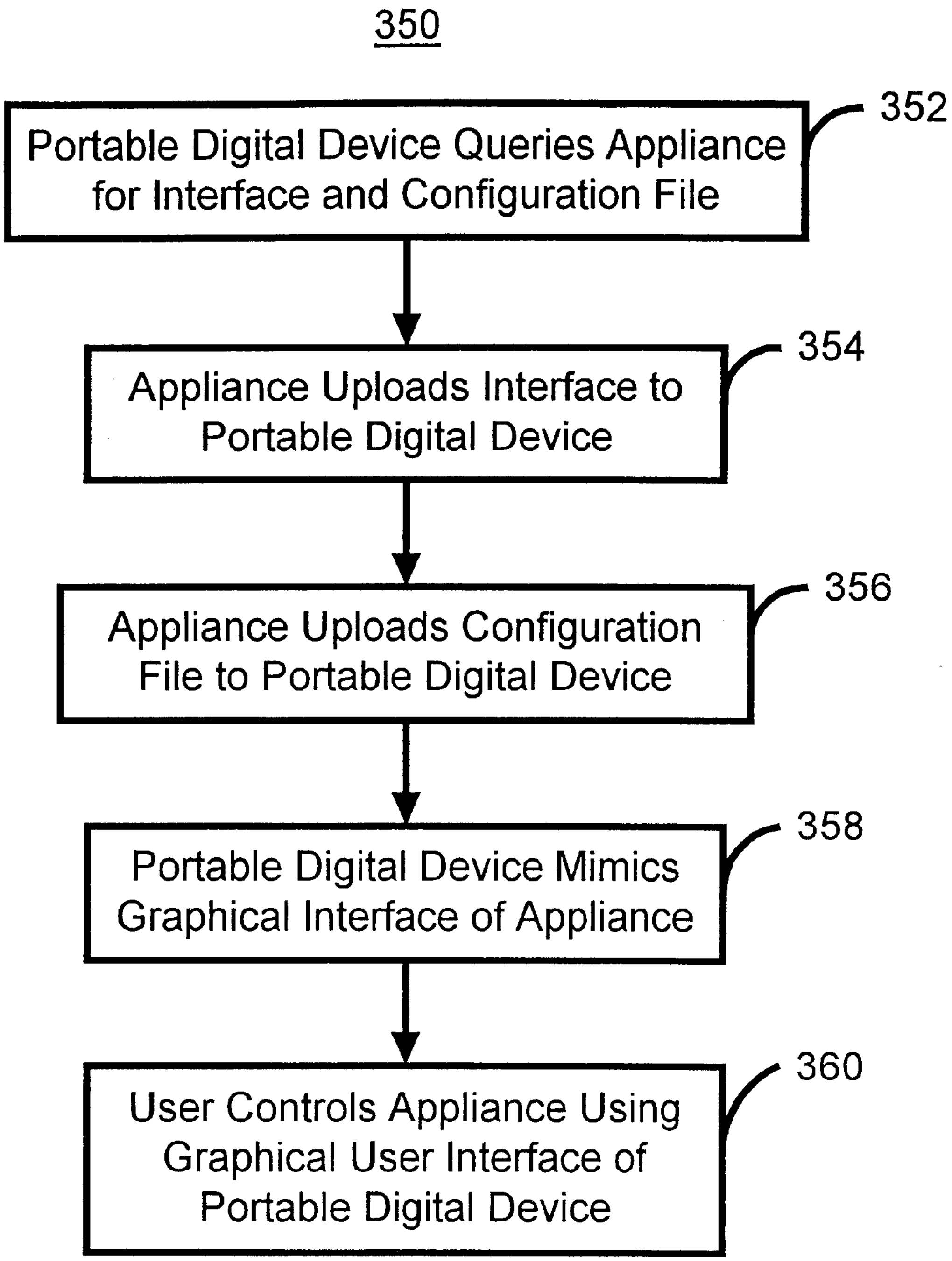
FIG. 8 is a flow chart depicting one embodiment of a method in accordance with the present invention for providing the appliance's graphical user interface through the portable digital device.

FIG. 8 is a flow chart depicting one embodiment of a method 350 for controlling the appliance 120 using a graphical user interface displayed on the portable digital device 110. The portable digital device 110 queries the appliance 120 for the interface 270, via step 352. This query is provided from the wireless communication port 112 of the portable digital device 110 to the wireless communication port 112 of the appliance 120. The appliance 110 then uploads the interface 270 to the appliance 120 using the wireless communication ports 112 and 122, via step 354. Steps 352 and 354 are analogous to the steps carried out in the method 300. The appliance 120 also uploads the configuration object 290 to the portable digital device 110 using the wireless communication ports 112 and 122, via step 356. The configuration object 290 includes information describing the graphical interface, such as a control panel, on the display 126 of the appliance 120. The portable digital device 110 can then mimic the graphical interface of the appliance 120 on the display 116 of the portable digital device 110, via step 358. The user is then allowed to control the appliance 120 through the graphical user interface displayed on the display 116 of the portable digital device 110. The user can also view the status of the appliance 120 on the display 116 of the portable digital device.

Figure 9:
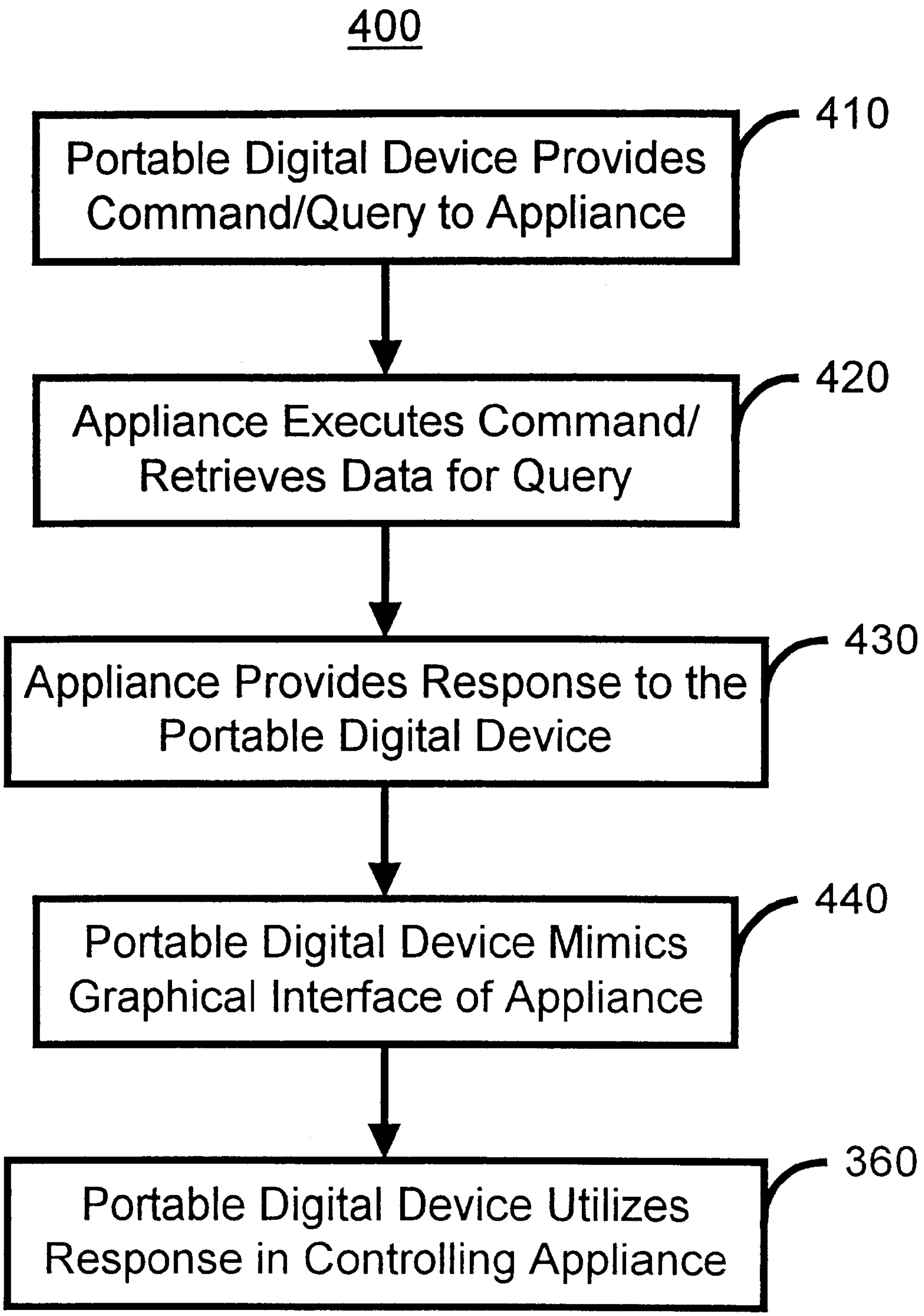
FIG. 9 depicts one embodiment of a method in accordance with the present invention for controlling the appliance.

FIG. 9 depicts one embodiment of a method 400 for controlling the appliance 120 using the portable digital device 110. The user aims the portable digital device 110 at the appliance 120. Using the wireless communication port 112, the portable digital device 110 provides a communication to the wireless communication port 122 of the appliance 120, via step 410. The communication may be a command, a query, or other information. Via step 420, the appliance 120 then executes the command or retrieves the information requested in the query. The appliance 120 provides a response to the portable digital device 110, via step 430. The response provided in step 430 depends upon the communication provided from the portable digital device 110. For example, if the communication provided in step 410 is a query for data or an object, the appliance 120 provides the data or the object to the portable digital device 110 in step 430. If the communication provided in step 410 is a command, then in step 430 the appliance 120 may provide a response stating that the command has been executed. The portable digital device 110 may optionally use the response provided in step 430 for controlling the appliance 120, via step 440.

Using the methods 300, 350, and 400, the portable digital device 110 can control all or a subset of the functions of the appliance 120. The portable digital device 110 may control only a portion of the functions of the appliance 120 in order to maintain the security of the appliance. Using the method 300, the portable digital device 110 may also obtain information relating to a password from the appliance 120. The user can, therefore, be required to input a password into the portable digital device 110 to access certain functions of the appliance 120.

Because the portable digital device 110 can communicate with the appliance 120 using the wireless communication ports 112 and 122, respectively, the user need not come very close to the appliance 120 in order to control the appliance. Furthermore, the communication between the portable digital device 110 and the appliance 120 is two-way. Thus, the appliance 120 can provide information to the portable digital device 110. Thus, the user can view data from the appliance 120 on the portable digital device 110. The user need not rely on the display 122 of the appliance 120 to determine the status of the appliance 120. Thus, the user can remotely control and obtain information about the appliance 120.

Moreover, the general purpose control program 240 of portable digital device 110 can use the general purpose display 230 to control many different appliances 120. Thus, a single portable digital device 110 can control a wide variety of appliances 120. This can be accomplished without preloading a separate control program for each appliance 120 within the portable digital device 110. Instead, the interface 270 from the particular appliance 120 is uploaded to the portable digital device 110 when the particular appliance 120 is to be controlled.

A method and system has been disclosed for remotely controlling an appliance using a portable device such as a personal digital assistant. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A portable digital device for remotely controlling an appliance, the appliance including a first wireless communication port and a first graphical interface, the portable digital device comprising:

a processor;

a second wireless communication port coupled with the processor;

a control program for use by the processor; and a second graphical interface;

wherein upon a query provided from the second wireless communication port to the first wireless communication port, the first graphical interface is provided from the appliance to the portable digital device, allowing the control program to control the appliance using the first graphical interface;

wherein the appliance further has a configuration object for providing the first graphical interface for the appliance and wherein the first graphical interface is provided from the appliance to the portable digital device by the appliance providing the configuration object to the portable digital device via the first wireless communication port and the second wireless communication port, allowing the portable digital device to mimic the first graphical interface on the graphical user interface of the portable digital device;

wherein the portable digital device can be used to control at least a portion of the appliance only in response to a user providing a password for the appliance;

wherein the first graphical interface is implemented using a plurality of application program interfaces, the plurality of application program interfaces being JAVABEANS interfaces.

2. The portable digital device of claim 1 wherein the appliance further includes data and wherein the data is provided to the portable digital device in response to a second query.

3. The portable digital device of claim 2 wherein the query and the second query are the same.

4. A system for remotely controlling an appliance including a first wireless communication port comprising:

an interface residing on the appliance, the interface capable of being uploaded to a portable digital device including a processor, a control program, and a second wireless communication port; and a configuration object for providing a first graphical interface for the appliance;

wherein upon a query provided from the second wireless communication port to the first wireless communication port, the first graphical interface is provided from the appliance to the portable digital device, allowing the control program to control the appliance using the interface; and wherein the first graphical interface is provided to the portable digital device by the appliance providing the configuration object to the portable digital device via the first wireless communication port and the second wireless communication port, allowing the portable digital device to mimic the first graphical interface of the appliance;

wherein the portable digital device can be used to control at least a portion of the appliance only in response to a user providing a password for the appliance;

wherein the first graphical interface is implemented using a plurality of application program interfaces, the plurality of application program interfaces being JAVABEANS interfaces.

5. A method for remotely controlling an appliance including a first wireless communication port interface comprising the steps of:

(a) providing an interface and a configuration object for providing first graphical interface for the appliance residing on the appliance; wherein the first graphical interface providing step (a) further includes the step of:

(a1) providing a plurality of application program interfaces, the plurality of application program interfaces being JAVABEANS interfaces;

(b) providing a portable digital device including a processor, a user interface, a control program, and a second wireless communication port; and (c) requiring a user to input a password for controlling at least a portion of the appliance;

wherein upon a query provided from the second wireless communication port to the first wireless communication port, the interface and the configuration object are provided from the appliance to the portable digital device, allowing the control program to control the appliance using the first graphical interface and allowing the portable digital device to mimic the first graphical interface of the appliance.

6. A method for remotely controlling an appliance using a portable digital device including a user interface, a processor, a second wireless communication port, the appliance including a first wireless communication port, a first graphical interface and a configuration object for providing the first graphical interface for the appliance, the method comprising the steps of:

(a) providing a command from the second wireless communication port of the portable digital device to the first wireless communication port of the appliance;

(b) providing the configuration object to the portable digital device via the first wireless communication port and the second wireless communication port, allowing the portable digital device to mimic the first graphical interface of the appliance; wherein the first graphical interface mimicked using a plurality of application program interfaces, the plurality of application program interfaces being JAVABEANS interfaces;

(c) executing the command using the appliance;

(d) providing a response from the first wireless communication port of the appliance to the second wireless communication port of the portable digital device; and (e) requiring a user to input a password for controlling at least a portion of the portable appliance.

7. A method for remotely controlling an appliance using a portable digital device including a user interface, a processor, and a second wireless communication port, the appliance including a first wireless communication port, an interface and a configuration object for providing a first graphical interface for the appliance, the method comprising the steps of:

(a) querying the appliance using the portable digital device, the query being provided from the second wireless communication port to the first wireless communication port;

(b) providing the first graphical interface from the appliance to the portable digital device to allow the portable digital device to control the appliance using the first graphical interface, wherein the step of providing the first graphical interface further includes the step of providing the configuration object to the portable digital device to allow the portable digital device to mimic the first graphical interface of the appliance; wherein the first graphical interface is implemented using a plurality of application program interfaces, the plurality of application program interfaces being JAVABEANS interfaces; and (c) requiring a user to input a password for controlling at least a portion of the appliance.

8. The portable digital imaging device of claim 1 wherein the appliance further includes a utility meter.

9. The system of claim 4 wherein the appliance further includes a utility meter.

10. The method of claim 5 wherein the appliance further includes a utility meter.

11. The method of claim 6 wherein the appliance further includes a utility meter.

12. The method of claim 7 wherein the appliance further includes a utility meter.

* * * * *